(12) United States Patent  
Immendorf et al.

(10) Patent No.: US 8,537,731 B2  
(45) Date of Patent: Sep. 17, 2013

(54) SYSTEMS AND METHODS FOR REDUCING CONGESTION IN A WIRELESS NETWORK

(75) Inventors: Chaz Immendorf, Mill Creek, WA (US); Eamonn Gormley, Redmond, WA (US)

(73) Assignee: Eden Rock Communications, LLC, Bothell, WA (US)

( * ) Notice: Subject to any disclaimer, the term of this patent is extended or adjusted under 35 U.S.C. 154(b) by 659 days.

(21) Appl. No.: 12/748,277

(22) Filed: Mar. 26, 2010

(65) Prior Publication Data

US 2010/0246391 A1 Sep. 30, 2010

Related U.S. Application Data

(60) Provisional application No. 61/164,142, filed on Mar. 27, 2009.

(51) Int. Cl.
*H04W 4/00* (2009.01)
*H04W 36/00* (2009.01)
*H04L 12/66* (2006.01)

(52) U.S. Cl.
USPC ........ 370/310; 370/338; 370/355; 455/422.1; 455/435.2; 455/436; 455/437; 455/438; 455/439; 455/440; 455/442; 455/443; 455/444

(58) Field of Classification Search
USPC ................. 370/310, 318, 320, 321, 322, 328, 370/329, 335, 336, 338, 342, 343, 348, 355, 370/437, 443, 444, 445, 447, 461, 462, 825.03; 455/403, 404, 418, 422, 422.1, 432, 434, 455/435.2, 436, 437, 438, 439, 440, 441, 455/442, 443, 450, 451, 452, 453, 454, 455, 455/455/456, 456.1, 509, 515, 517, 522, 455/524, 525

See application file for complete search history.

(56) References Cited

U.S. PATENT DOCUMENTS

| | | | |
|---|---|---|---|
| 6,578,077 B1 * | 6/2003 | Rakoshitz et al. | 709/224 |
| 2002/0186657 A1 * | 12/2002 | Jain et al. | 370/235 |
| 2007/0293235 A1 * | 12/2007 | Inayoshi et al. | 455/455 |
| 2009/0005049 A1 | 1/2009 | Nishio et al. | |

FOREIGN PATENT DOCUMENTS

| | | |
|---|---|---|
| KR | 100828544 B1 | 5/2008 |
| WO | WO 2006075951 A1 | 7/2006 |

OTHER PUBLICATIONS

Schield, "Statistical Literacy: Difficulties in Describing and Comparing Rates and Percentages", Nov. 13, 2000, ASA JSM 2000, pp. 1-6.*
International Search Report and Written Opinion for PCT/US10/28941 dated Nov. 9, 2010.

* cited by examiner

*Primary Examiner* — Kwang B Yao
*Assistant Examiner* — Adam Duda

(57) ABSTRACT

A system and method are described for reducing congestion in a wireless network. A wireless base station becomes congested when substantially all of the available base station airlink resources are being used during a period of time. It is useful, however, to distinguish between periods of congestion with few users and periods where a larger number of users are using the base station. When there are few users a congestion situation is not necessarily a problem, while it is more likely that users' quality of experience and quality of service suffers as the number of users increases. This system and method determines when a base station is congested and implements a congestion prime management scenario when the number of active users is above an activity threshold.

18 Claims, 11 Drawing Sheets

SYSTEMS AND METHODS FOR REDUCING CONGESTION IN A WIRELESS NETWORK

CROSS REFERENCE TO RELATED APPLICATIONS

The present application claims the benefit of U.S. Provisional Application No. 61/164,142, filed Mar. 27, 2009, which is incorporated herein by reference.

FIELD OF THE INVENTION

The field of the present invention generally relates to detecting and responding to a congestion scenario in a base station sector in a cellular wireless packet data network. The systems and methods herein manage congestion based upon the number of subscriber devices that are actively transferring data on a wireless resource at the time of congestion.

BACKGROUND OF THE INVENTION

In modern wireless networks, users expect and demand a minimum standard of service including a rapid data transfer rate as well as low signal latency or delay. As the number of subscriber devices using a particular network base station increases, the base station or network in general may become saturated with data transfers and a user's quality of experience and quality of service suffers. However, not all network congestion contributes equally to the detriment of the user, and it is beneficial to distinguish between at least two different congestion scenarios in order to optimize a congestion response.

In a first congestion scenario, a network base station or wireless sector may be congested with data transfers initiated by a relatively small number of users. The small number of users may be using all of the airlink resources or channels of a base station but the users may still be receiving optimal service. For example, if a handful of users are requesting data transfers resulting in a congested wireless sector, the user's quality of experience may remain high despite the congestion if they are experiencing a high rate of data transfer.

In a second congestion scenario, a network base station or a wireless sector may be congested with data transfers initiated by a relatively large number of users. In this case, a large number of users are using the airlink resources or channels of the base station and each user's quality of experience may be degraded because of the problems associated with congestion.

Prior art systems for dealing with congestion do not differentiate between the two congestion scenarios, leading to a sub-optimal response to congestion in a network. By failing to distinguish between congestion caused by a relatively small number of users and congestion caused by a relatively larger number of users, the systems and methods fail to tailor any congestion-mitigating responses appropriate to the number of users.

In view of the foregoing, it would be optimal for any systems and methods for identifying and reacting to congestion in a wireless network to distinguish between the two types of congestion and respond accordingly. Additionally, a system or method for managing congestion in a wireless network would need to effectively identify the number of active users associated with a particular base station or wireless sector as well as identify when the base station is experiencing congestion.

SUMMARY OF THE INVENTION

This summary is provided to introduce (in a simplified form) a selection of concepts that are further described below in the Detailed Description. This summary is not intended to identify key features of the claimed subject matter, nor is it intended to be used as an aid in determining the scope of the claimed subject matter.

In overcoming the above disadvantages associated with current congestion detection and response algorithms, the present invention discloses systems and methods for determining a congestion prime scenario on the basis of a percentage of resource utilization and the number of active users. In an embodiment, the present invention discloses a computer-implemented method for reducing congestion in a wireless communication system, comprising: determining if a wireless sector is congested; determining if a number of active consumer premises equipment in the wireless sector is above a threshold; and implementing a congestion prime scenario to reduce a level of congestion in the wireless sector when the number of active consumer premises equipment is above the threshold.

In accordance with another aspect of the present invention, determining if the wireless sector is congested further comprises: determining a percentage of a set of airlink resources in use; and determining when the percentage of the set of airlink resources is above a congestion threshold.

In accordance with another aspect of the present invention, determining the number of active consumer premises equipment further comprises, for each consumer premises equipment in the wireless sector: tracking a number of bytes transmitted or received by a consumer premises equipment during a measurement period; and determining whether the number of bytes transmitted or received is above an activity threshold; and counting the number of consumer premises equipment that was determined to be above the activity threshold.

In accordance with another aspect of the present invention, the congestion prime scenario comprises: handing off at least one consumer premises equipment to a base station in the wireless communication network.

In accordance with another aspect of the present invention, the congestion prime scenario comprises: classifying at least one consumer premises equipment as using a low-order modulation and coding scheme or a high-order modulation and coding scheme; and handing off at least one consumer premises equipment to another base station in the wireless communication network, wherein the at least one consumer premises equipment was classified as using the low-order modulation and coding scheme.

In accordance with another aspect of the present invention, the congestion prime scenario comprises: identifying at least one consumer premises equipment using a largest share of a set of airlink resources; and handing off the at least one consumer premises equipment to a base station in the wireless communication network.

In accordance with another aspect of the present invention, the congestion prime scenario comprises: reducing a data rate for at least one consumer premises equipment.

In accordance with another aspect of the present invention, the congestion prime scenario comprises: reducing a peak data rate for at least one consumer premises equipment using a lowest order modulation and coding scheme.

In accordance with another aspect of the present invention, the congestion prime scenario comprises: reducing a peak data rate for at least one consumer premises equipment using a largest percentage of a set of airlink resources.

In accordance with another aspect of the present invention, the wireless sector is a base station sector.

In accordance with a further aspect of the present invention is a wireless communication system for reducing congestion, comprising: a first base station; a second base station; at least one consumer premises equipment; and a data communication network facilitating data communication amongst the first base station, the second base station, and the at least one consumer premises equipment, wherein the system is configured to: determine if a wireless sector associated with the first base station is congested; determine if a number of active consumer premises equipment in the wireless sector is above a threshold; and implement a congestion prime scenario to reduce a level of congestion in the wireless sector when the number of active consumer premises equipment is above the threshold.

In accordance with another aspect of the present invention, the congestion prime scenario comprises: handing off at least one consumer premises equipment to the second base station in the wireless communication network.

In accordance with another aspect of the present invention, the congestion prime scenario comprises: classifying at least one consumer premises equipment as using a low-order modulation and coding scheme or a high-order modulation and coding scheme; and handing off at least one consumer premises equipment to the second base station in the wireless communication network, wherein the at least one consumer premises equipment was classified as using the low-order modulation and coding scheme.

In accordance with another aspect of the present invention, the congestion prime scenario comprises: identifying at least one consumer premises equipment using the most airlink resources; and handing off the at least one consumer premises equipment to the second base station in the wireless communication network.

In accordance with a further aspect of the present invention is a computer readable medium encoded with computer-executable instructions for reducing congestion in a wireless communication system, which when executed, performs a method comprising: determining if a wireless sector is congested; determining if a number of active consumer premises equipment in the wireless sector is above a threshold; and implementing a congestion prime scenario to reduce a level of congestion in the wireless sector when the number of active consumer premises equipment is above the threshold.

In accordance with a further aspect of the present invention is a wireless base station for reducing congestion in an associated wireless sector, comprising: at least one memory; and at least one processor operatively coupled to the memory, wherein the wireless base station is configured to: determine if the wireless sector is congested; determine if a number of active consumer premises equipment in the wireless sector is above a threshold; and implement a congestion prime scenario to reduce a level of congestion in the wireless sector when the number of active consumer premises equipment is above the threshold.

BRIEF DESCRIPTION OF THE DRAWINGS

Preferred and alternative examples of the present invention are described in detail below by way of example and with reference to the drawings, in which.

DETAILED DESCRIPTION

Figure 1:
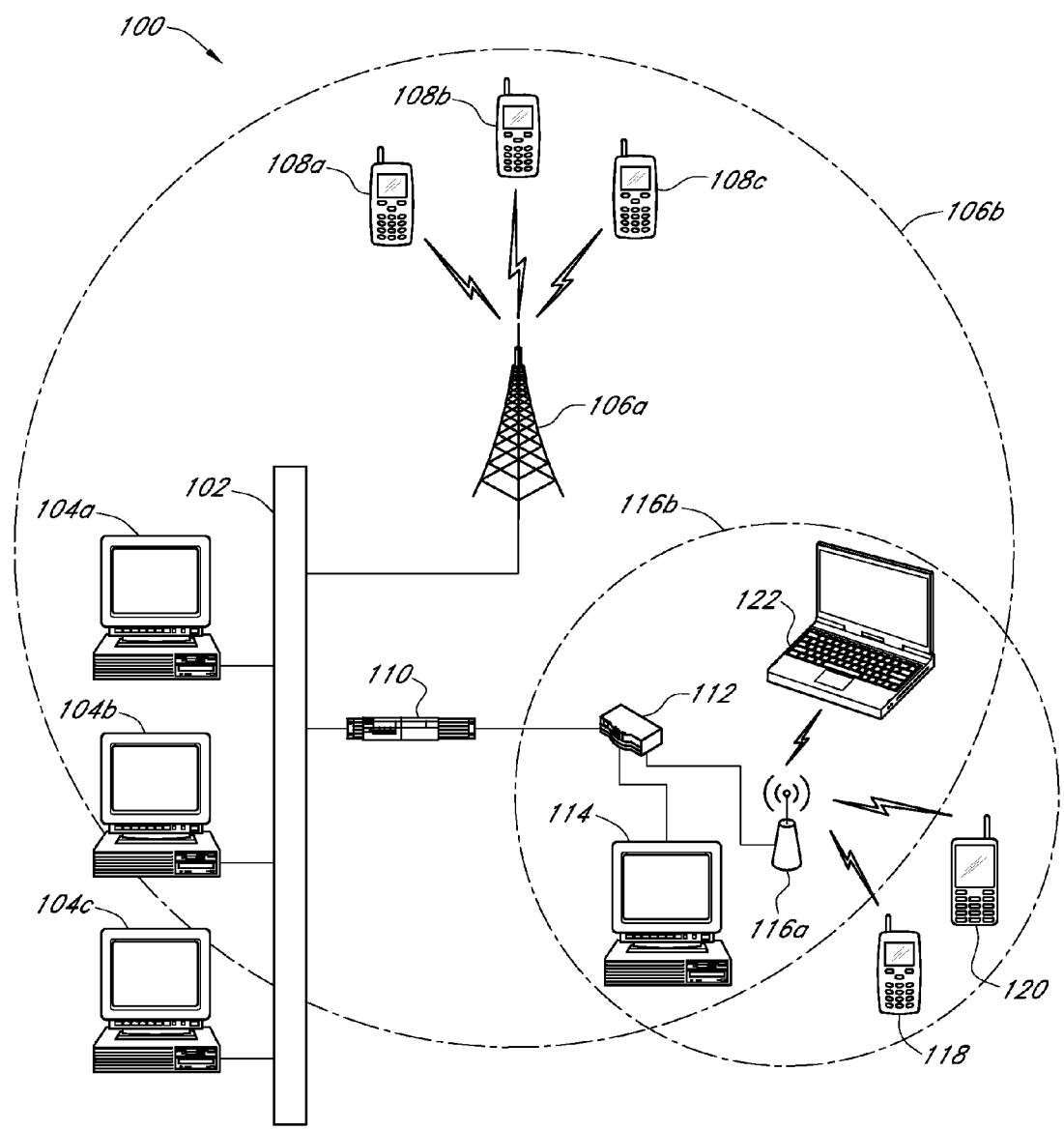
FIG. 1 illustrates a perspective view of a networked computing system in accordance with an embodiment of the present invention.

In accordance with an exemplary embodiment of the present invention, FIG. 1 illustrates a perspective view of a networked computing system 100 including various wireline and wireless computing devices that may be utilized to implement any of the resource allocation processes associated with various embodiments of the present invention. The networked computing system 100 may include, but is not limited to, one or more remote base station devices 106a, which may be associated with a macrocell, a microcell, or a picocell base station that may be a neighboring base station to one or more short-range base station devices 116a (e.g., a femtocell or picocell device) within a particular region of the networked computing system 100; a group of remote service provider devices 104a-c, including server computers or any other common network device known in the art such as routers, gateways, or switch devices, which can support network resource allocation and/or digital data communication services to various network subscriber computing devices (e.g., any of the devices 108a-c, 110, 112, 114, 116a, 118, 120, and 122); a data communications network 102, including both Wide Area Network 106b (WAN), and Local Area Network 116b (LAN) portions; a variety of wireless user equipment, including: cellular phone or PDA devices 108a-c, 118 and 120, and a laptop or netbook computer 122, along with any other common portable wireless computing devices well known in the art (e.g., handheld gaming units, personal music players, video recorders, electronic book devices, etc.) that are capable of communicating with the data communications network 102 utilizing one or more of the remote base stations 106a, the short-range base station device 116a, or any other common wireless or wireline network communications technology; one or more network gateways or switch devices 110 and router 112 that can facilitate data communications processes within the LAN and between the LAN and the WAN of the data communications network 102; and a desktop computer 114 optionally connected to the LAN. While FIG. 1 only illustrates one long-range base station device 106a and one short-range base station device 116a, it may be apparent that the networked computing system 100 may include multiple base stations with varying degrees of size and overlap.

In an embodiment, the remote base station 106a, the short-range base station device 116a (e.g., a femtocell or picocell base station), the remote service provider devices 104a-c, or any of the user equipment (e.g., 108a-c, 114, 118, 120, or 122) may be configured to run any well-known operating system, including, but not limited to: Microsoft® Windows®, Mac OS®, Google® Chrome®, Linux®, Unix®, or any well-known mobile operating system, including Symbian®, Palm®, Windows Mobile®, Google® Android®, Mobile Linux®, MXI®, etc. In an embodiment, the remote base station 106a may employ any number of common server, desktop, laptop, and personal computing devices.

In an embodiment, the user equipment (e.g., 108a-c, 114, 118, 120, or 122) may include any combination of common mobile computing devices (e.g., laptop computers, netbook computers, cellular phones, PDAs, handheld gaming units, electronic book devices, personal music players, MiFi™ devices, video recorders, etc.), having wireless communications capabilities employing any common wireless data commutations technology, including, but not limited to: GSM™, UMTS™, LTE™, LTE Advanced™, WiMAX™, WiFi™, etc.

In an embodiment, either of the LAN or the WAN portions of the data communications network 102 of FIG. 1 may employ, but are not limited to, any of the following common communications technologies: optical fiber, coaxial cable, twisted pair cable, Ethernet cable, and powerline cable, along with any wireless communication technology known in the art. In an embodiment, the remote wireless base station 106a, the wireless user equipment (e.g., 108a-c, 118, 120, or 122), as well as any of the other LAN connected computing devices (e.g., 110, 112, or 114) may include any standard computing software and hardware necessary for processing, storing, and communicating data amongst each other within the networked computing system 100. The computing hardware realized by any of the network computing system 100 devices (e.g., 104a-c, 106a, 108a-c, 110, 112, 114, 116a, 118, 120, or 122) may include, but is not limited to: one or more processors, volatile and non-volatile memories, user interfaces, transcoders, modems, and wireline and/or wireless communications transceivers, etc.

Further, any of the networked computing system 100 devices (e.g., 104a-c, 106a, 108a-c, 110, 112, 114, 116a, 118, 120, or 122) may be configured to include one or more computer-readable media (e.g., any common volatile or non-volatile memory type) encoded with a set of computer readable instructions, which when executed, performs a portion of any of the resource allocation processes associated with various embodiments of the present invention.

In an embodiment, user equipment (e.g., 108a-c, 118, 120, and 122) may simultaneously reside within the wireless communications coverage area 116b of the short-range base station device 116a as well as within the wireless communications coverage area 106b of the base station 106a, or the user equipment may reside in a single, non-overlapping area of LAN 116b or WAN 106b.

Figure 2:
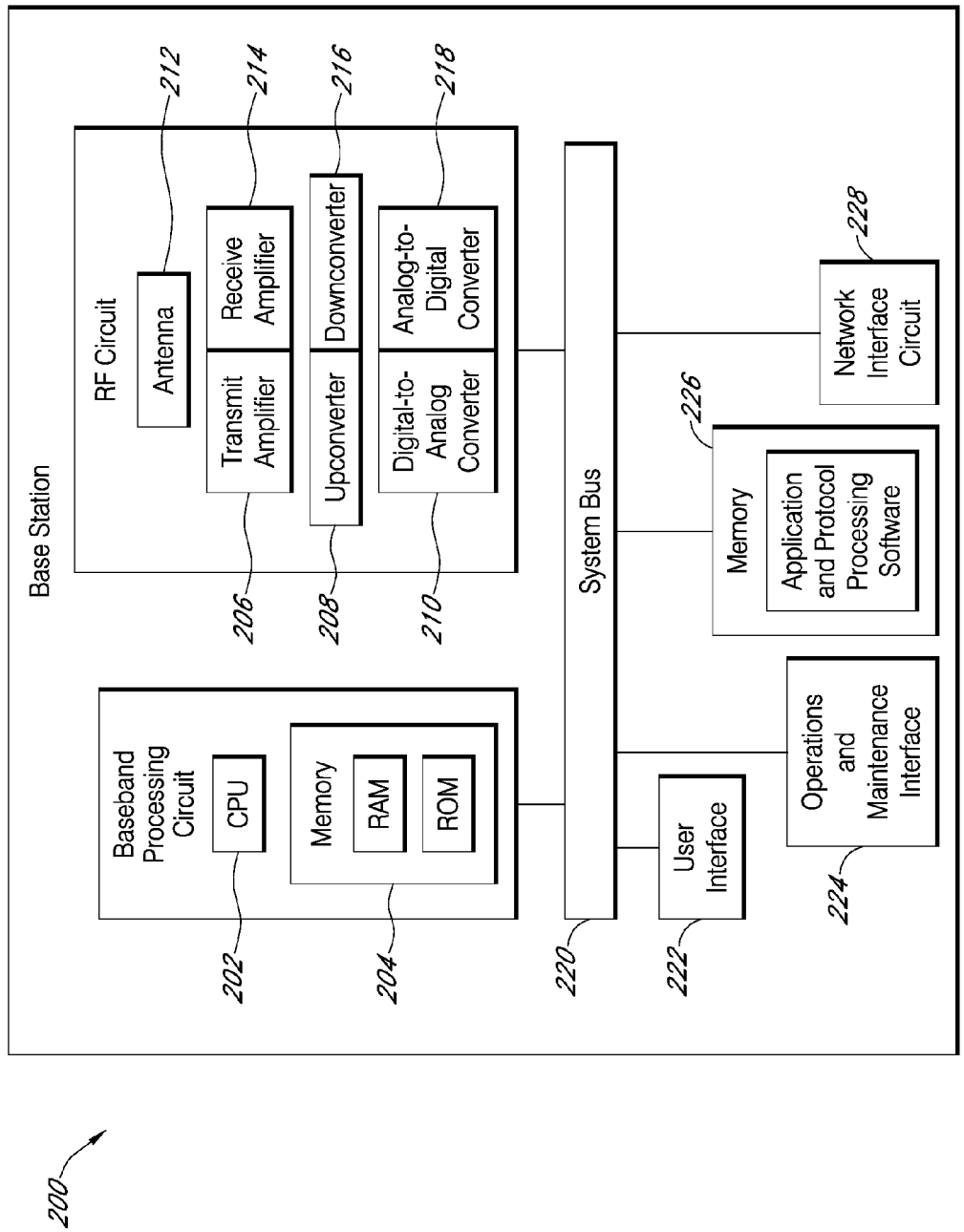
FIG. 2 illustrates a block diagram view of a base station in accordance with an embodiment of the present invention.

FIG. 2 illustrates a block diagram view of a base station device 200 (e.g., a femtocell, picocell, microcell, or a macrocell device) that may be representative of the long-range base station device 106a and/or the short-range base station device 116a in FIG. 1. In accordance with an embodiment of the present invention, the base station device 200 may include, but is not limited to, a baseband processing circuit including at least one central processing unit (CPU) 202. In an embodiment, the CPU 202 may include an arithmetic logic unit (ALU, not shown) that performs arithmetical and logical operations and one or more control units (CUs, not shown) that extract instructions and stored content from memory and then executes and/or processes them, calling on the ALU when necessary during program execution. The CPU 202 is responsible for executing all computer programs stored on the base station device's 200 volatile (RAM) and nonvolatile (ROM) system memories, 204 and 226.

The base station device 200 may also include, but is not limited to, a radio frequency (RF) circuit for transmitting and receiving data to and from the network. The RF circuit may include, but is not limited to, a transmit path including a digital-to-analog converter 210 for converting digital signals from the system bus 220 into analog signals to be transmitted, an upconverter 208 for setting the frequency of the analog signal, and a transmit amplifier 206 for amplifying analog signals to be sent to the antenna 212. Further, the RF circuit may also include, but is not limited to, a receive path including the receive amplifier 214 for amplifying the signals received by the antenna 212, a downconverter 216 for reducing the frequency of the received signals, and an analog-to-digital converter 218 for outputting the received signals onto the system bus 220. The system bus 220 facilitates data communication amongst all the hardware resources of the base station device 200.

Further, the base station device 200 may also include, but is not limited to, a user interface 222; operations and maintenance interface 224; memory 226 storing application and protocol processing software for performing the congestion determination, active CPE determination, congestion prime scenario implementation, and other processes in accordance with the present invention; and a network interface circuit 228 facilitating communication across the LAN and/or WAN portions of the data communications network 102 (i.e., a backhaul network).

In accordance with an embodiment of the present invention, the base station 200 may use any modulation/encoding scheme known in the art such as Binary Phase Shift Keying (BPSK, having 1 bit/symbol), Quadrature Phase Shift Keying (QPSK, having 2 bits/symbol), and Quadrature Amplitude Modulation (e.g., 16-QAM, 64-QAM, etc., having 4 bits/symbol, 6 bits/symbol, etc.). Additionally, the base station 200 may be configured to communicate with the subscriber devices (e.g., 108a-c, 118, 120, and 122) via any Cellular Data Communications Protocol, including any common GSM, UMTS, WiMAX or LTE protocol.

Figure 3:
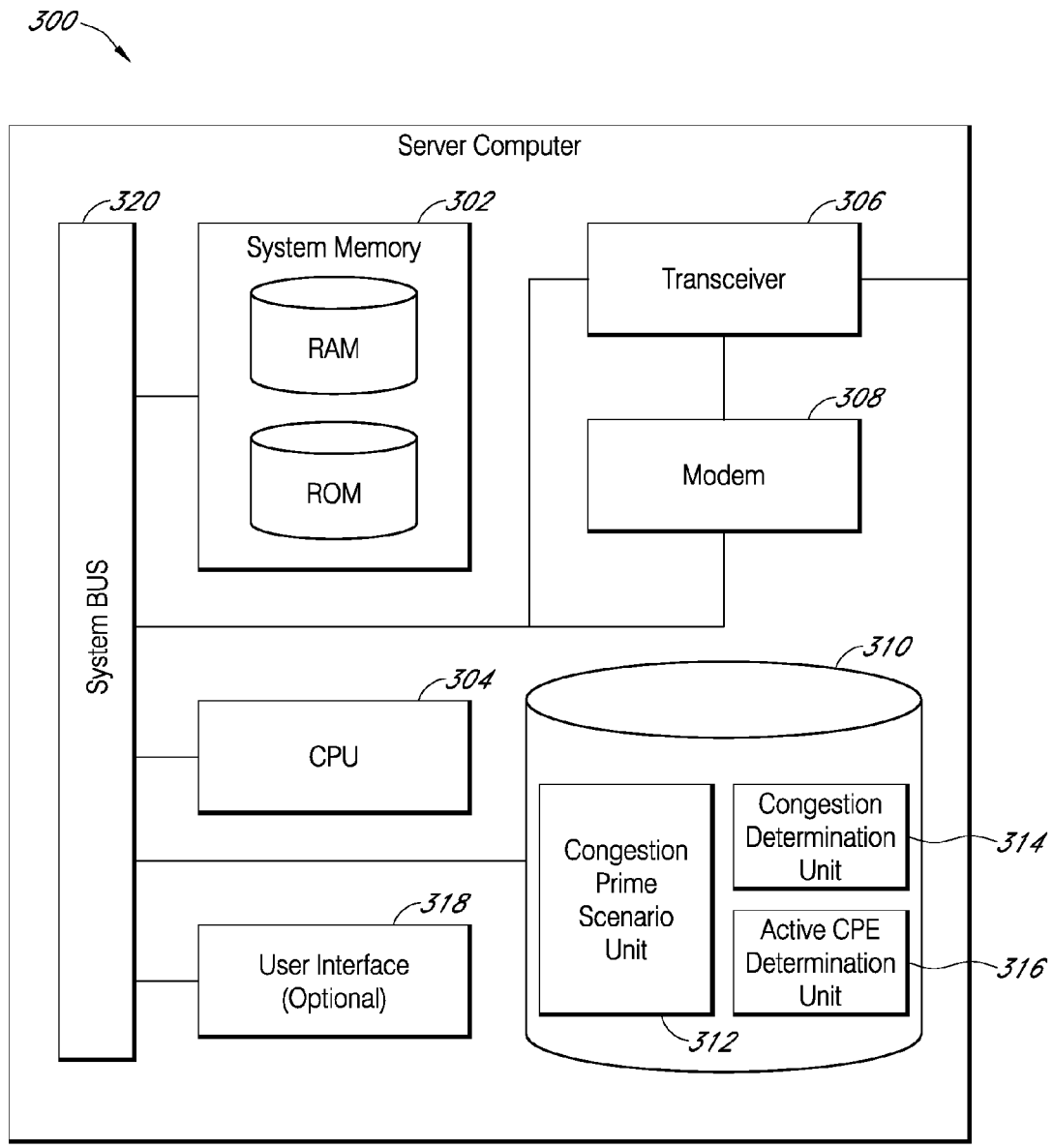
FIG. 3 illustrates a block diagram of a server computer in accordance with an embodiment of the present invention.

FIG. 3 illustrates a block diagram view of a server computer 300 that may be representative of any of the remote service provider devices 104a-c or the base station 106a and 116a in FIG. 1, or any other common network device known in the art such as a router, gateway, or switch device. The server computer 300 may include, but is not limited to, one or more processor devices including a central processing unit (CPU) 304. In an embodiment, the CPU 304 may include an arithmetic logic unit (ALU, not shown) that performs arithmetic and logical operations and one or more control units (CUs, not shown) that extracts instructions and stored content from memory and then executes and/or processes them, calling on the ALU when necessary during program execution. The CPU 304 is responsible for executing all computer programs stored on the server computer's 300 volatile (RAM), nonvolatile (ROM), and long-term storage system memories, 302 and 310.

Figure 5:
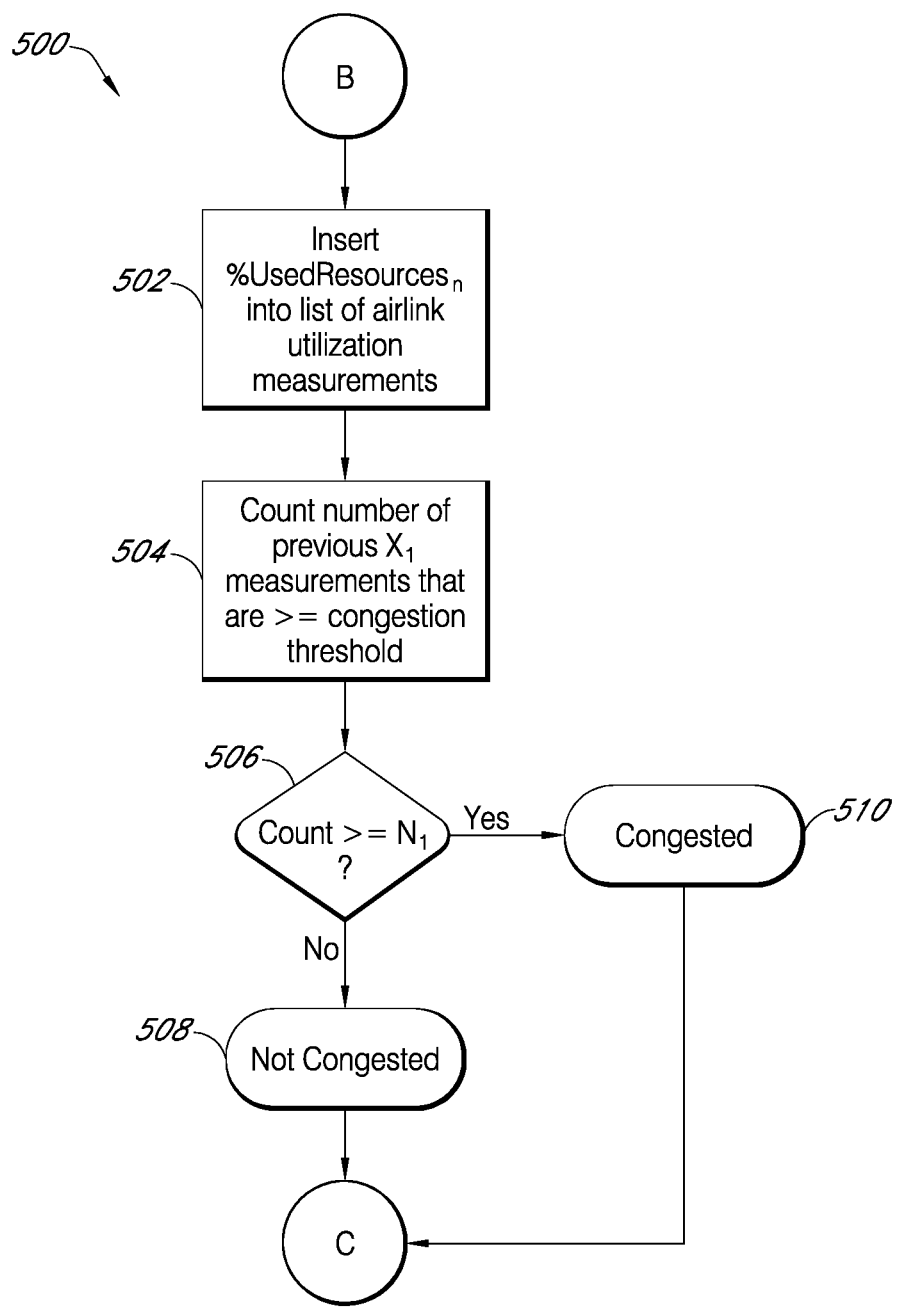
FIG. 5 illustrates a first flow diagram depicting processes for detecting congestion in accordance with an embodiment of the present invention.
Figure 6:
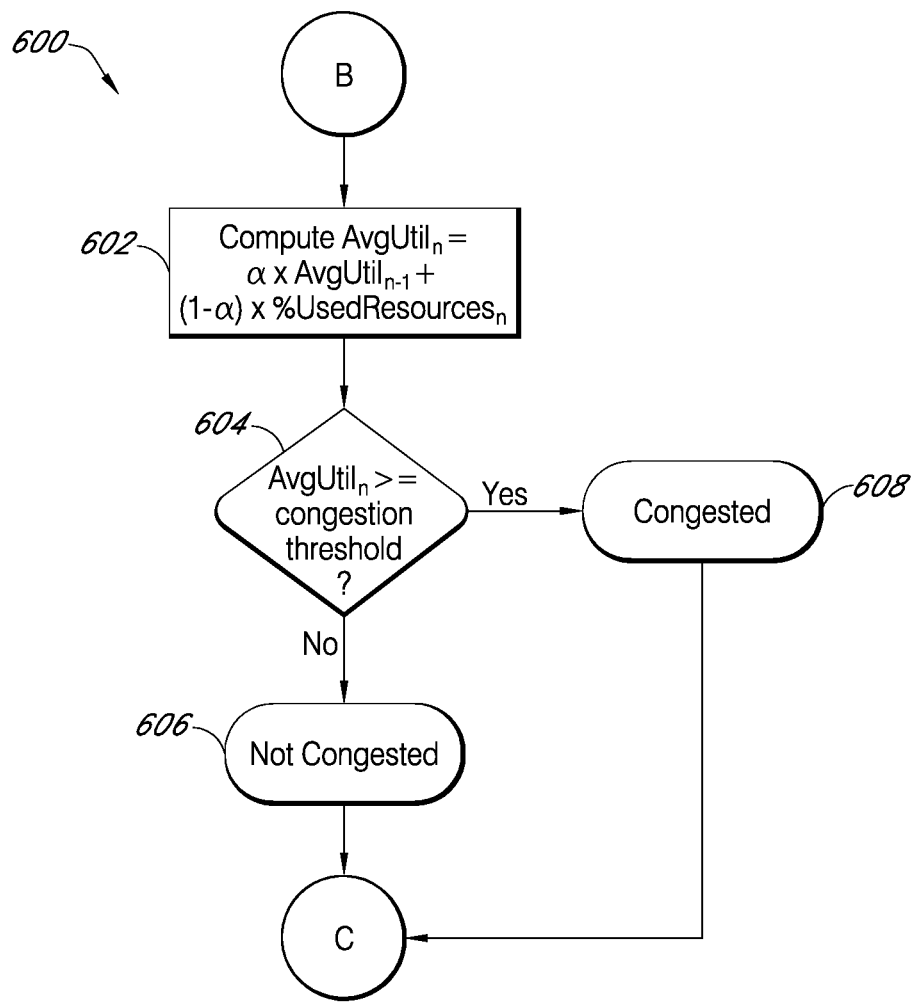
FIG. 6 illustrates a second flow diagram depicting processes for detecting congestion in accordance with an embodiment of the present invention.

The server computer 300 may also include, but is not limited to, an optional user interface 318 that allows a server administrator to interact with the server computer's 300 software and hardware resources and to display the performance and operation of the networked computing system 100; a software/database repository 310 including: a congestion prime scenario unit 312 that may implement a congestion management scenario in accordance with the present invention; active consumer premises equipment (CPE) determination unit 316 that may implement a process for determining when a CPE is considered to be an active CPE relative to a base station or wireless sector (e.g., activity detection in FIGS. 7 and 8); and a congestion determination unit 314 for implementing a process for detecting and determining the presence of congestion in a base station or wireless sector (e.g., congestion determination in FIGS. 5 and 6). Further, the server computer 300 may also include a modem 308 for formatting data communications prior to transfer; a transceiver 306 for transmitting and receiving network communications amongst various network base stations, user equipment, and computing devices utilizing the data communication network 102 of the networked computing system 100; and a system bus 320 that facilitates data communications amongst all the hardware resources of the server computer 300.

Figure 4:
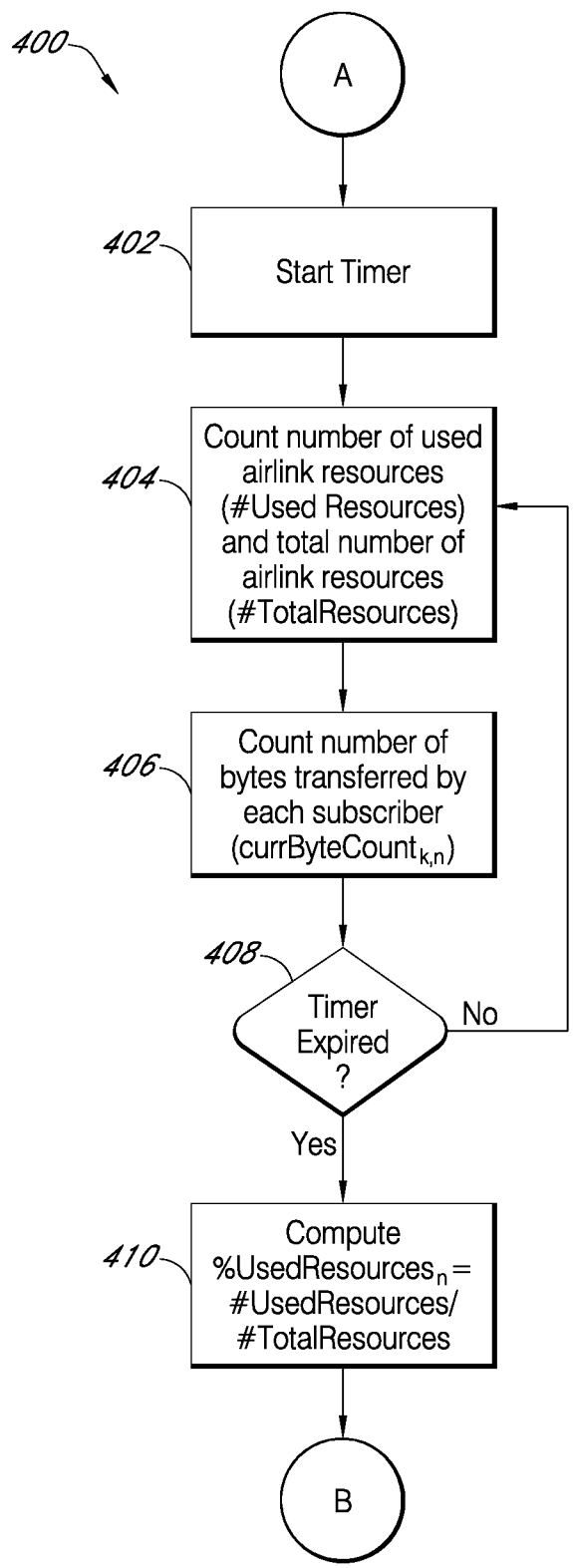
FIG. 4 illustrates a flow diagram depicting processes for establishing a measurement period and making measurements that can be used to indicate if a channel is congested in accordance with an embodiment of the present invention.

FIG. 4 illustrates a flow diagram 400 depicting processes for establishing a measurement period and making measurements that can be used to indicate if a channel is congested. The channel can be a downlink channel (from base station to CPEs) or an uplink channel (from CPEs to base station). It should be understood that this process could be executed using one or more computer-executable programs stored on one or more computer-readable media located on any one of the base station devices (e.g., 106a and 116a), collaboratively on the network base station 106a, in the remote service provider devices 104a-c in FIG. 1, or in the server computer 300 in FIG. 3. In block 402, a timer is started which begins a measurement period. The measurement period may be any time period, with exemplary time periods ranging from seconds to minutes. In one embodiment, a time period is fixed at two minutes. Additionally, the measurement period may be determined by a network engineer and fine-tuned according to the network performance. Next, in block 404 a base station (e.g., base station 116a) counts the number of used airlink resources (e.g., #UsedResources) and the total number of airlink resources (e.g., #TotalResources). In one embodiment, an airlink resource may be a set of frequency slots and/or time slots over which a base station 116a and a subscriber device (e.g., 118, 120, and 122) transmit and receive data. In an alternate embodiment, an airlink resource may be a unit of backhaul capacity. In one embodiment, an airlink resource may be considered to be a used airlink resource during a particular time period when the resource has transmitted or received data.

Next, at block 406 the process 400 counts the number of bytes transferred by each subscriber device (e.g., 118, 120, and 122). This value may be represented as currByteCount$_{k,n}$, wherein the k subscript corresponds to an identifier for a particular consumer premises equipment (CPE), while the n subscript corresponds to a measurement period (e.g., $t_1$, $t_2$, $t_3$, etc., or specific time periods). Thus the currByteCount$_{k,n}$ is specific to each subscriber device. The sum of each currByteCount$_{k,n}$ would correspond to the total actual throughput for a base station device 116a during a time period n. In one embodiment, separate counts of currByteCount$_{k,n}$ may be kept for both the uplink and downlink transfers, or a single count may be kept for the sum of the uplink or downlink bytes transferred by each CPE$_k$. Next, the process checks at block 408 to determine whether the measurement period has elapsed, and if not, the process returns to block 404 to continue to measure the base station activity. By way of example, a currByteCount$_{k,n}$ might represent 1.5 MB transferred by a CPE$_k$ (e.g., a specific subscriber device 118, 120, or 122) during the measurement period (e.g., $t_1$=2 minutes).

In general, the airlink resources and the number of bytes transferred by each subscriber (e.g., currByteCount$_{k,n}$) are monitored throughout a measurement period because packet data is bursty in nature. This is due to the discrete nature of packet communications as well as the manner in which the CPE are used. Often a user is not continuously utilizing resources and instead data is transferred in a sporadic, bursty manner. For example, a user browsing the Internet on an internet-enabled phone (e.g., a CPE 118, 120, and 122) may desire to read the news online and may select a news article to read. The CPE will download data for the article from a base station and then the CPE will remain idle while the user reads the article. When the user requests a different article the CPE again downloads data in a flurry of activity and then returns to an idle state while still remaining connected to the base station. At any point in time, various subscriber devices (e.g., 118, 120, and 122) may be active or idle with respect to data transfer, but may nonetheless be considered to be active or idle when analyzed over a period of time. Thus, monitoring the base station usage throughout a measurement period develops a more complete snapshot of the base station utilization.

When the measurement period is completed, the process 400 moves to block 410 where it computes a percentage of used resources for a measurement period n. Block 410 computes this value using the following equation:

$$\% \text{ UsedResources}_n = \#\text{UsedResources}/\#\text{TotalResources} \quad (1)$$

In equation (1) above, the #UsedResources represents the number of used airlink resources in a base station and the #TotalResources represents the number of total airlink resources available to a base station 116a during the measurement period in steps 404, 406, and 408. In a situation where the observed base station is lightly loaded, the percentage of used resources (i.e., % UsedResources$_n$) will be a low value, while in a situation approaching traffic saturation the percentage of used resources will approach 100%. The measurements currByteCount$_{k,n}$ and % UsedResources$_n$ may be used later with respect to processes in FIGS. 5-8, respectively.

FIG. 5 illustrates a flow diagram 500 depicting processes for detecting congestion in accordance with an embodiment of the present invention. Again, it should be understood that this process could be executed using one or more computer-executable programs stored on one or more computer-readable media located on any one of the base station devices (e.g., 106a and 116a), collaboratively on the network base station 106a, in the remote service provider devices 104a-c in FIG. 1, or in the server computer 300 in FIG. 3. The process 500 represents a first process for congestion detection, while process 600 illustrates an alternate embodiment. Continuing from block 410 in FIG. 4, at block 502 the % UsedResources$_n$ value is inserted into a list of airlink utilization measurements. The list may be represented as any ring buffer, array, list, tree, or graph known in the Art. At block 504, the process 500 analyzes the list tracking the % UsedResources$_n$ and counts the number of previous $X_1$ measurements that are greater than or equal to a congestion threshold. In one embodiment, the congestion threshold may represent a percentage value above which the link is deemed to be congested. By way of example, a congestion threshold may be set at 90%, 95%, or some other percentage that may be determined either analytically or empirically. By way of a further example, block 504 may determine 5 out of the last 10 ($X_1$) measurements are above an exemplary congestion threshold of 95%. In other words, a base station is congested at a particular time period if the % UsedResources$_n$ for that time period is above the congestion threshold value, while a count may be used to track the time periods when the base station is congested. In a further embodiment, the congestion threshold may be set statically, dynamically, or according to historical data.

At block 506 the count determined in block 504 may be compared to a congestion count threshold, $N_1$. If the count is greater than or equal to $N_1$ the link is determined to be congested in block 510. If the count is less than $N_1$, the link is determined to be not congested in block 508. Continuing with the above example (where the count=5), the base station would be congested for any value of $N_1$ less than or equal to 5. In one embodiment, the congestion count threshold $N_1$ may be set statically, dynamically, or according to historical data.

FIG. 6 illustrates a second flow diagram 600 depicting processes for detecting congestion in accordance with an embodiment of the present invention. Again, it should be understood that this process could be executed using one or more computer-executable programs stored on one or more computer-readable media located on any one of the base station devices (e.g., 106a and 116a), collaboratively on the network base station 106a, in the remote service provider devices 104a-c in FIG. 1, or in the server computer 300 in FIG. 3. As mentioned above, process 600 represents an alternative process to the congestion detection process 500 illustrated in FIG. 5. Generally, FIG. 6 represents a single pole Infinite Impulse Response (IIR) filter, although other low-pass structures may also be used such as a Finite Impulse (FIR) or other IIRs. Continuing from block 410 in FIG. 4, at block 602 the process 600 computes an average airlink resource utilization for a corresponding time period. This average utilization, or AvgUtil$_n$, is computed according to the following equation:

$$\text{AvgUtil}_n = \alpha \times \text{AvgUtil}_{n-1} + (1-\alpha) \times \% \text{UsedResources}_n \quad (2)$$

Thus, the AvgUtil$_n$ represents a running average of the percentage of used resources for a particular time period. In equation (2) above, the α (alpha) value ranges between zero and 1.0. If alpha is set relatively high (e.g., 0.9), the equation (2) weights the previous average (AvgUtil$_{n-1}$) more than if alpha is set relatively low (e.g., 0.1). If alpha is set low, the process responds more quickly to sudden changes in the average airlink resource utilization in a time period. In one embodiment, the alpha value may be set statically, dynamically, or according to historical data.

Next, at block 604 the running average for the percentage of used airlink resources (AvgUtil$_n$) is compared to determine if it is greater than or equal to a congestion threshold. If AvgUtil$_n$ is greater than the threshold (e.g., 90%) than the base station or wireless sector is determined to be congested in block 608. If the AvgUtil$_n$ is less than a congestion threshold, the base station is determined to be not congested in block 606. In one embodiment, the congestion threshold may be set statically, dynamically, or according to historical data. In another embodiment, the congestion threshold in FIG. 6 may be the same or different value as the congestion threshold in FIG. 5.

Figure 7:
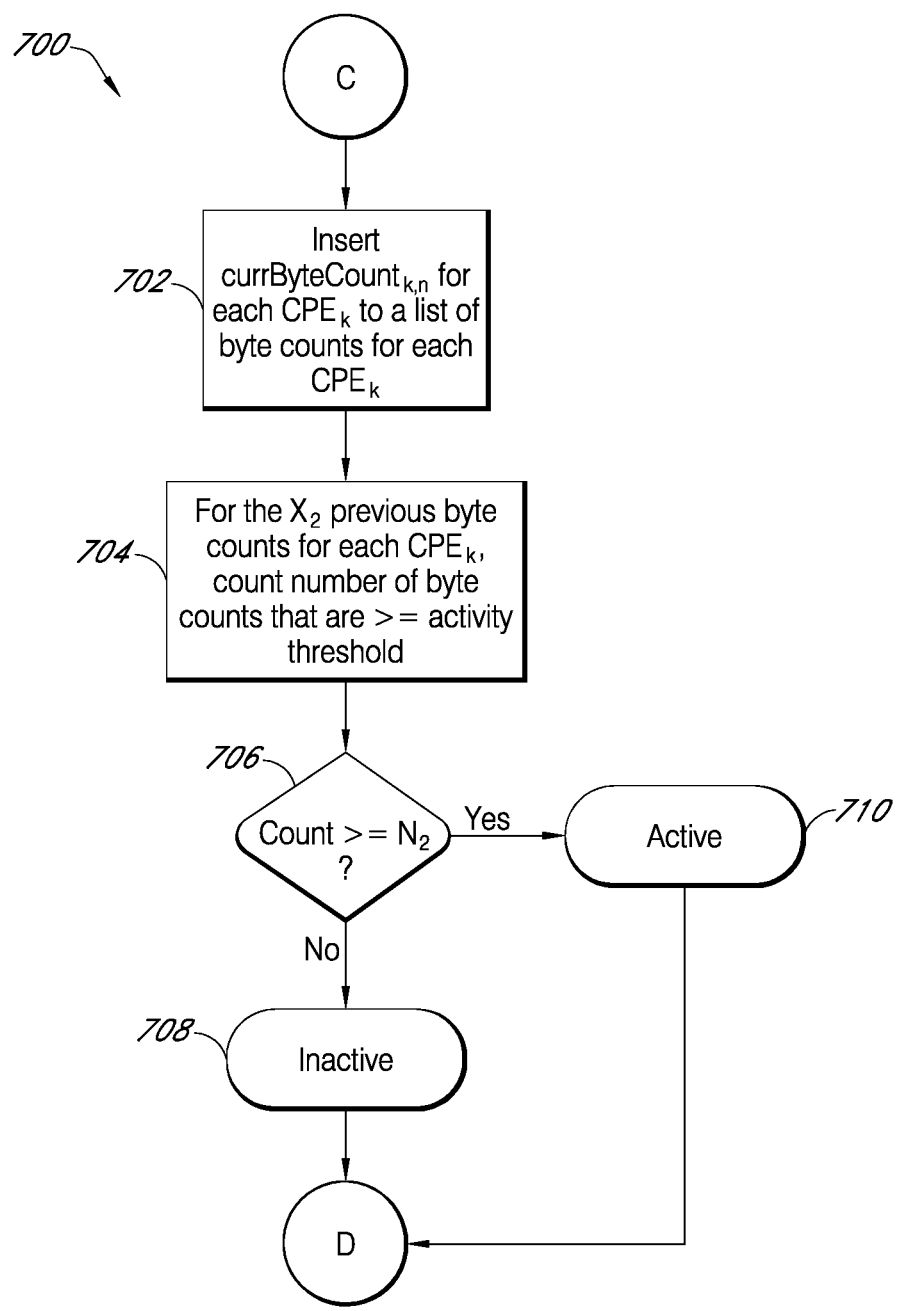
FIG. 7 illustrates a first flow diagram depicting processes for determining if a consumer premises equipment is active in accordance with an embodiment of the present invention.
Figure 8:
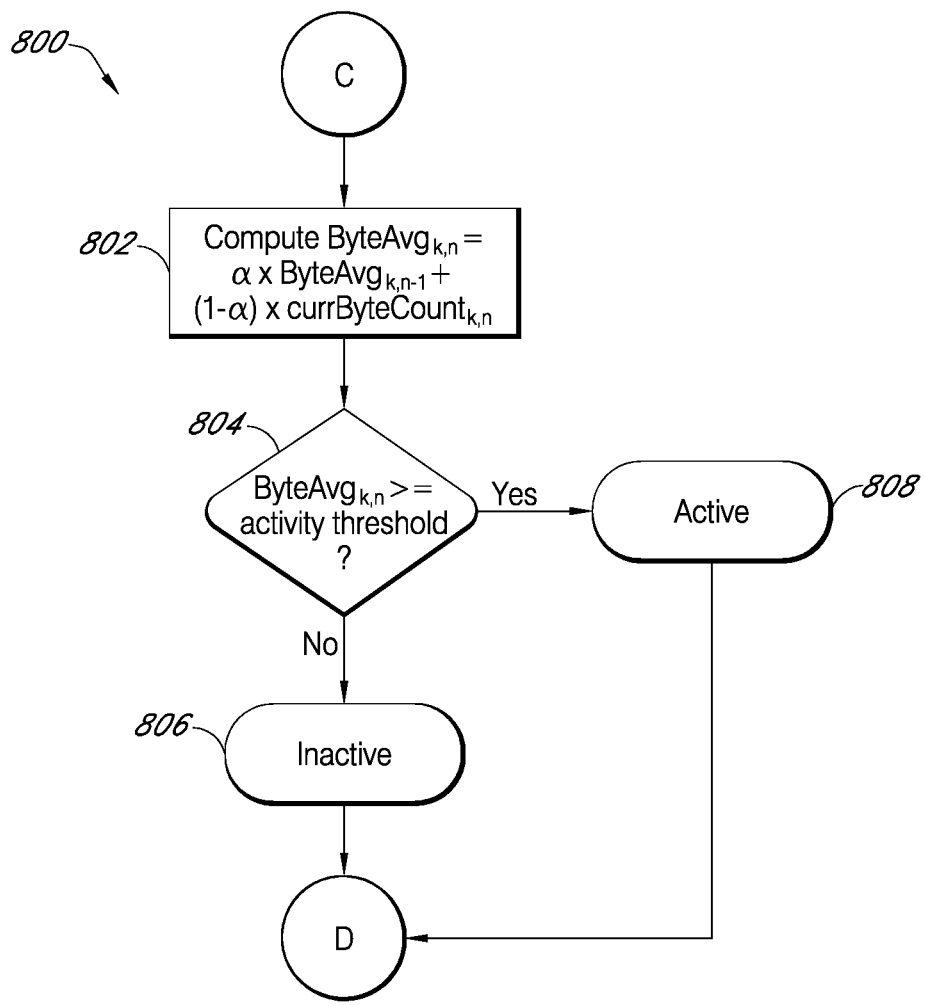
FIG. 8 illustrates a second flow diagram depicting processes for determining if a consumer premises equipment is active in accordance with an embodiment of the present invention.

FIG. 7 illustrates a flow diagram 700 depicting processes for determining if a consumer premises equipment (CPE) is active in accordance with an embodiment of the present invention. Again, it should be understood that this process could be executed using one or more computer-executable programs stored on one or more computer-readable media located on any one of the base station devices (e.g., 106a and 116a), collaboratively on the network base station 106a, in the remote service provider devices 104a-c in FIG. 1, or in the server computer 300 in FIG. 3. The process 700 represents a first example of a process for identifying active CPEs, while process 800 in FIG. 8 illustrates an alternate embodiment. Continuing from blocks 508/510 in FIG. 5 or blocks 606/608 in FIG. 6, at block 702 the currByteCount$_{k,n}$ (measured in FIG. 4) is inserted into a list of byte counts for each specific CPE$_k$. In one embodiment, the list may be any length and stored by any method including, but not limited to, a ring buffer, FILO queue, or any method known in the Art.

Next, at block 704 the process 700 counts the $X_2$ previous byte counts (e.g., currByteCount$_{k,n}$) in the list that are equal or greater than an activity threshold. In one embodiment, an activity threshold is defined as the number of bytes that a CPE must have transferred in a measurement period for the CPE to be considered active during that measurement period. In another embodiment, the activity threshold may be set statically, dynamically, or according to historical data. At block 706 it is determined if the count is above an activity count threshold $N_2$. If the count is above $N_2$ the CPE is considered to be active in block 710, while if the count is below the threshold the CPE is considered to be inactive in block 708. By way of example, a CPE may be considered to be active if 8 out of the last 10 currByteCount$_{k,n}$ are above an activity threshold (e.g., transferring at least 1.5 MB of data during the measurement period in FIG. 4). As would be understood by one skilled in the Art, any values may be used for the count $X_2$, an activity threshold, or the count $N_2$.

FIG. 8 illustrates a flow diagram 800 depicting a second process for determining if a consumer premises equipment (CPE) is active in accordance with an embodiment of the present invention. Again, it should be understood that this process could be executed using one or more computer-executable programs stored on one or more computer-readable media located on any one of the base station devices (e.g., 106a and 116a), collaboratively on the network base station 106a, in the remote service provider devices 104a-c in FIG. 1, or in the server computer 300 in FIG. 3. As described above, process 800 represents an alternative process to the activity detection process 700 illustrated in FIG. 7. Continuing from blocks 508/510 in FIG. 5 or blocks 606/608 in FIG. 6, at block 802 the process 800 computes an average bandwidth utilization for a corresponding time period. This average utilization, or ByteAvg$_{k,n}$, is computed according to the following equation:

$$\text{ByteAvg}_{k,n} = \alpha \times \text{ByteAvg}_{k,n-1} + (1-\alpha) \times \text{currByteCount}_{k,n} \quad (3)$$

Thus, the ByteAvg$_{k,n}$ represents a running average of the current byte usage for a specific CPE for a particular time period. In equation (3) above, the α (alpha) value ranges between zero and 1.0. If alpha is set relatively high (e.g., 0.9), the equation (2) weights the previous average (ByteAvg$_{k,n-1}$) more than if alpha is set relatively low (e.g., 0.1). If alpha is set low, the process responds more quickly to sudden changes in the number of bytes transmitted or received by a CPE. In one embodiment, the alpha value may be set statically, dynamically, or according to historical data, and the alpha value may be set independently of any alpha value represented in FIG. 6.

Next, at block 804 the running average for current byte usage for a specific CPE (ByteAvg$_{k,n}$) is compared to against an activity threshold. If ByteAvg$_{k,n}$ is greater than or equal to the threshold (e.g., 1.5 MB transmitted during a measurement period $t_1$) than the specific CPE is determined to be active in block 808. If the ByteAvg$_{k,n}$ is less than the activity threshold, the CPE$_k$ is determined to be inactive in block 806. In one embodiment, the activity threshold may be set statically, dynamically, according to historical data, or based on the type of CPE (e.g., laptop, phone, PDA, internet-enabled device, etc.).

Figure 9:
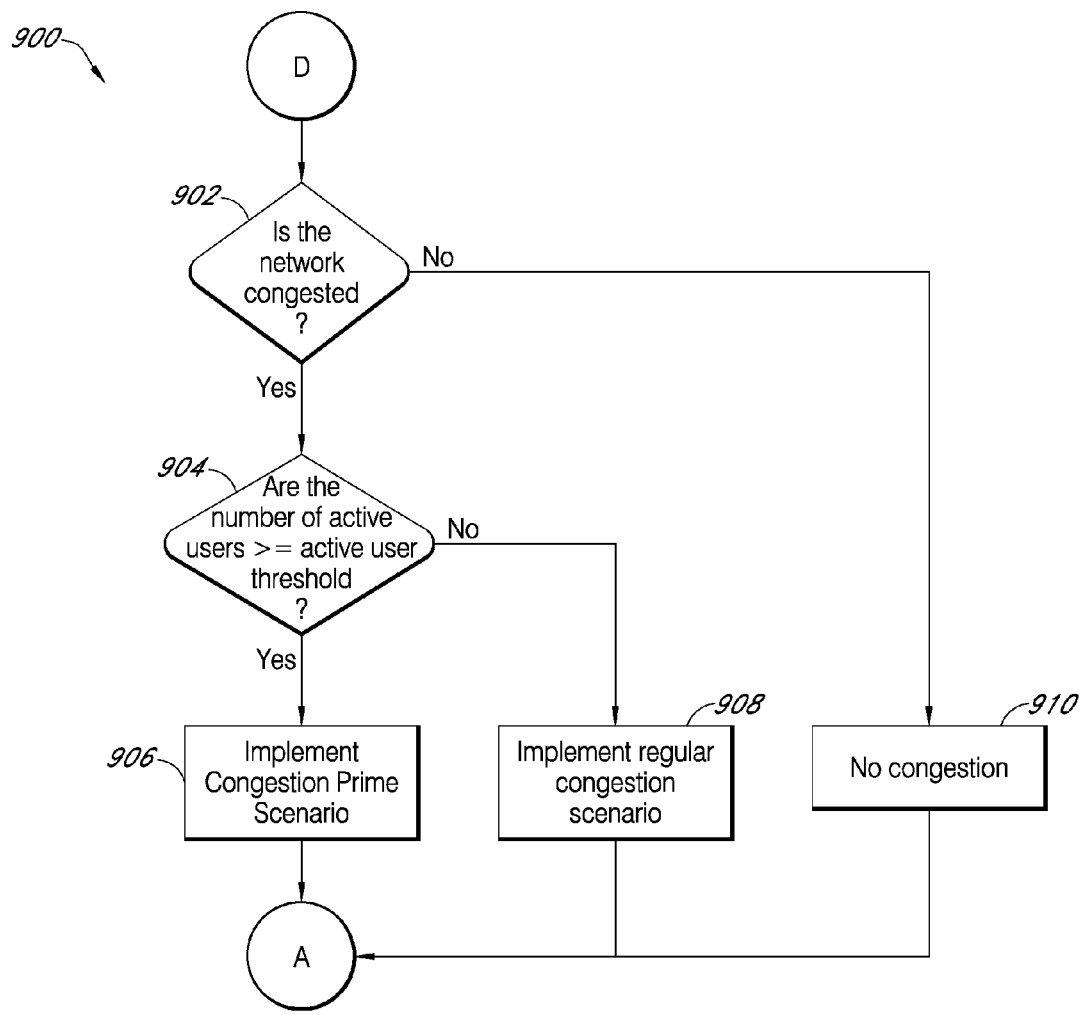
FIG. 9 illustrates a flow diagram depicting processes for distinguishing between various congestion scenarios in accordance with an embodiment of the present invention.
Figure 10:
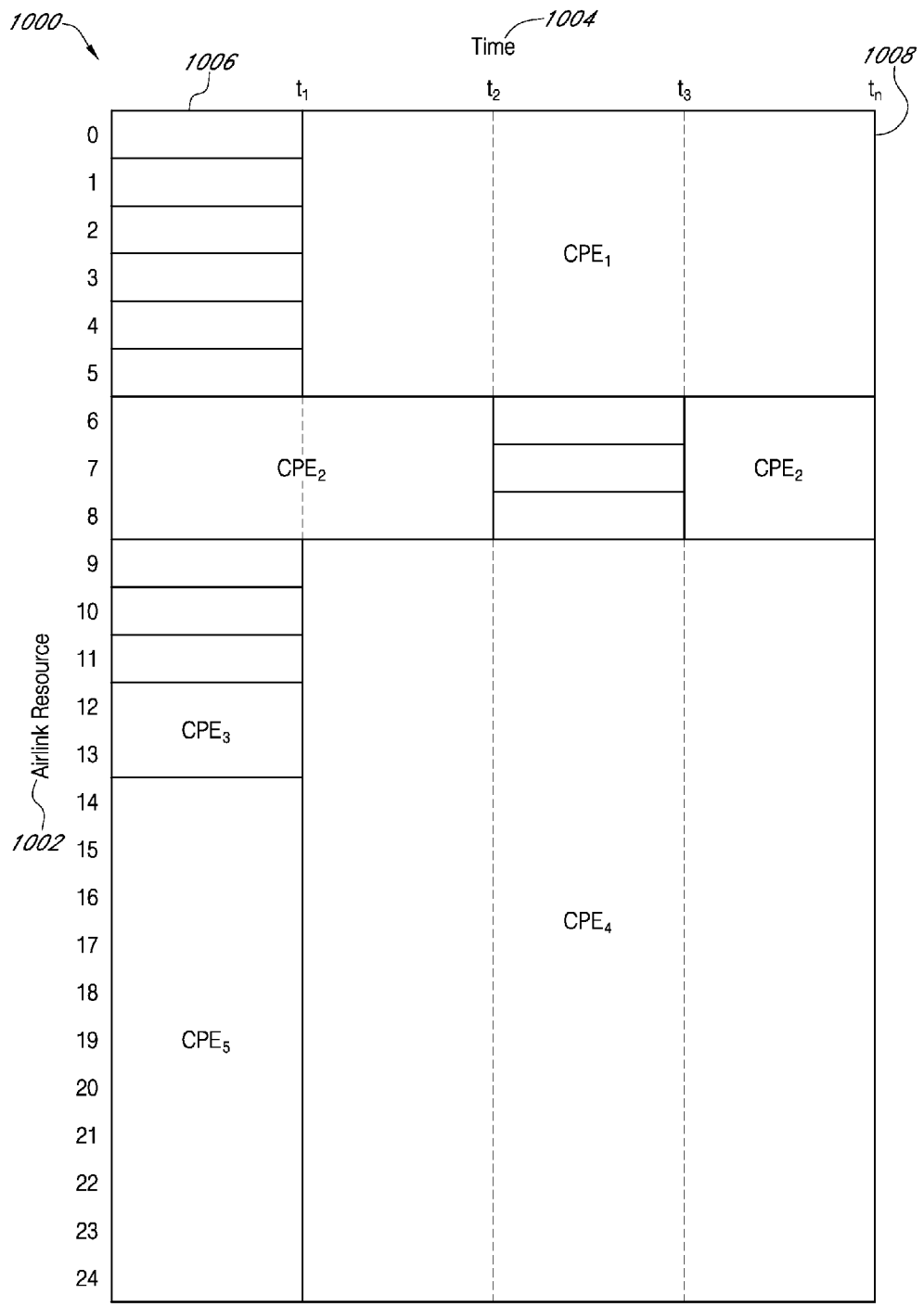
FIG. 10 illustrates by way of example an ordinary congestion scenario for a set of airlink resources accordance with an embodiment of the present invention.

FIG. 9 illustrates a flow diagram 900 depicting processes for distinguishing between various congestion scenarios in accordance with an embodiment of the present invention. Again, it should be understood that this process could be executed using one or more computer-executable programs stored on one or more computer-readable media located on any one of the base station devices (e.g., 106a and 116a), collaboratively on the network base station 106a, in the remote service provider devices 104a-c in FIG. 1, or in the server computer 300 in FIG. 3. Continuing from blocks 708/710 in FIG. 7 or blocks 806/808 in FIG. 8, at block 902 it is determined if the network is congested. This determination may be based upon the congestion determinations made in FIGS. 5 and/or 6. If the network is not congested, the process moves to block 910 and the process is completed. If the network, base station, and/or wireless sector is congested, the process moves to block 904. In block 904 a determination is made whether the number of active users is greater than an active user threshold. A user is determined to be an active user based upon the determinations made in FIGS. 7 and/or 8. In an alternate embodiment, the action taken in block 904 may depend on the average amount of data that each CPE is transferring during the times of congestion. In one embodiment, the active user threshold may be set statically, dynamically, according to historical data, or based on the type of CPE (e.g., laptop, phone, PDA, internet-enabled device, etc.). If the number of active users is not above an active user threshold, the system may implement regular congestion management scenarios in block 908. Alternately, the system may take no action if the airlink usage indicates a regular congestion scenario. In one embodiment, an example of an airlink resource utilization where the number of active users is not above the active user threshold is illustrated in FIG. 10. However, if the number of active users is above the active user threshold (illustrated by the airlink resource utilization in FIG. 11), the process may implement a congestion prime management scenario in block 906.

When a base station is determined to implement a congestion prime management scenario in block 906, the base station (e.g. 116a) may attempt to reduce the congestion via several methods. In a first method, the base station (e.g., 116a) may attempt to hand off one or more of the CPE (e.g., 108a-c, 118, 120, and 122) to another base station (e.g., 106a). By having some of the CPE obtain service from another base station (e.g., 106a) in the network, the airlink resources at the first base station (e.g., 116a) will be used by fewer active CPE, providing the active remaining CPE with a higher overall throughput in the base station or wireless sector.

In a second congestion prime management method, a base station (e.g., 116a) may attempt to hand off CPE (e.g., 108a-c, 118, 120, and 122) that are using lower order modulation and coding schemes to another base station (e.g., 106a). This second method is similar to the first method as described above, but this method attempts to determine the biggest improvement in capacity by handing off the CPE that make the most inefficient use of the airlink resources. Examples of modulation and coding schemes include, but are not limited to, Binary Phase Shift Keying (BPSK, having 1 bit/symbol), Quadrature Phase Shift Keying (QPSK, having 2 bits/symbol), and Quadrature Amplitude Modulation (e.g., 16-QAM, 64-QAM, etc., having 4 bits/symbol, 6 bits/symbol, etc.). As is known in the Art, a CPE using BPSK would use more bandwidth (i.e., airlink resources) than a CPE using QPSK as a modulation scheme. Under this second method, a base station (e.g., 116a) would attempt to hand off the CPE using the BPSK in a congestion prime scenario because the biggest bandwidth gains may be realized by this hand off.

In a third congestion prime management scenario, the base station (e.g., 116a) may attempt to hand off one or more CPE (e.g., 108a-c, 118, 120, and 122) that are using the most airlink resources to another base station (e.g., 106a). This third method is similar to the second method, but this method analyzes both the amount of data that each CPE is transferring as well as the modulation and coding scheme that is used by each CPE. The airlink resource usage for each CPE must be calculated from the measured amount of bytes transferred during the measurement period (e.g., currByteCount$_{k,n}$) in addition to tracking the modulation and coding scheme associated with the CPE uplink and/or downlink. In one embodiment, the third method may make a determination based upon an average or peak uplink and/or downlink data rates.

In a fourth congestion prime management scenario, the base station (e.g., 116a) may reduce the data rate for CPE (e.g., 108a-c, 118, 120, and 122) that are using lower order modulations or that are using the most airlink resources. This method may be used if a CPE cannot be handed off to another base station as in the first, second, and third methods described above. Under this method, the maximum data rate of the CPE that are using the lowest order modulations, or the CPE using the most airlink resources, is reduced. This action to reduce the data rate frees up airlink resources which may then be used by other CPE, thereby allowing the CPE remaining connected to the base station (e.g., 116a) to increase their throughput.

Figure 11:
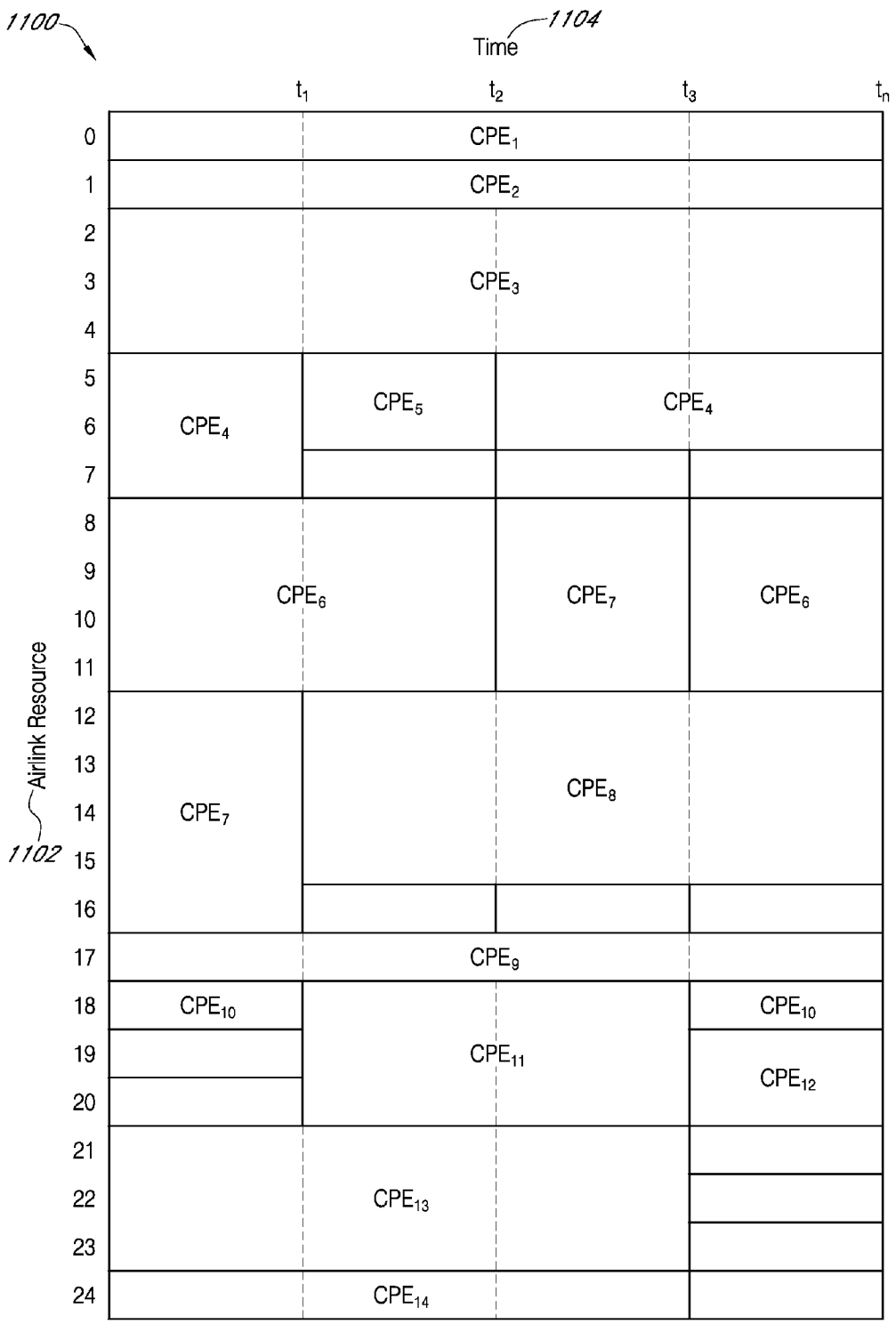
FIG. 11 illustrates by way of example a congestion prime scenario for a set of airlink resources in accordance with an embodiment of the present invention.

FIG. 10 illustrates by way of example an ordinary congestion scenario 1000 for a set of airlink resources accordance with an embodiment of the present invention. FIG. 11 illustrates by way of example a congestion prime scenario 1100 for a set of airlink resources in accordance with an embodiment of the present invention. FIGS. 10 and 11 will be described together to explain the congestion prime scenario management systems and method according to the present invention.

Airlink resources are represented by the airlink resources 1002 and 1102 labeled 0-24 in FIGS. 10 and 11. In one embodiment, airlink resources 1002/1102 may represent frequency slots and/or time slots available in a wireless communication system. In an alternate embodiment, airlink resources may represent a unit of capacity of a backhaul connection (e.g., 102). The airlink resources 1002/1102 may be monitored over a time period 1004/1104. This time period 1004/1104 may be any length of time or time periods and/or may correspond to the measurement period described in relation to FIG. 4. In the example shown in FIGS. 10 and 11, the time period is divided into four equal time periods $t_1, t_2, t_3, t_n$.

For the purposes of this example, an unused airlink resource is represented as an empty block 1006. An airlink resource that is being used by a CPE is labeled according to the particular CPE utilizing the resource (e.g., airlink resource 1008 utilized by $CPE_1$). The size of a set of airlink resources in use by a particular CPE may be determined by counting the number of blocks associated with the CPE. For example, block 1008 utilized by $CPE_1$ comprises 18 airlink resource blocks. All the used and unused resource blocks may be tallied to determine a % UsedResources$_n$. In this example, FIG. 10 illustrates 12 unused resource blocks and 88 used airlink resource blocks used by 5 CPE. FIG. 11 also illustrates the same proportion of used and unused airlink resource blocks (e.g., 12 unused and 88 used), although the airlink resource blocks in FIG. 11 are used by 14 CPE.

In one (oversimplified) embodiment, each airlink resource block in FIGS. 10 and 11 may be considered to represent an equal amount of transferred or received data. However, it would be understood by a person skilled in the art that the data amount may vary depending on the modulation or encoding scheme, as well as other factors.

By way of example, the scenario illustrated in FIG. 10 may show an airlink resource usage that triggers an ordinary congestion response (e.g., block 908) while the scenario illustrated in FIG. 11 may show an airlink resource usage that triggers a congestion prime scenario response (e.g., block 906). Although the usage examples show the same % UsedResources (e.g., 88 used airlink resources/100 total airlink resources), there may not be enough active CPE in FIG. 10 to trigger the congestion prime scenario. In one embodiment, if an activity threshold is set at 3 airlink resource blocks, $CPE_3$ in FIG. 10 (using 2 airlink resource blocks) may not be considered an active CPE while $CPE_2$ (using 3 airlink resource blocks) would be an active CPE. Thus, using an activity threshold of 3 blocks, FIG. 10 would represent 4 active CPE. If the active user threshold was set at 5 CPE (e.g., in block 904), there would not be enough active CPE to trigger the congestion prime scenario in FIG. 10 despite having the same percentage of used airlink resources as the scenario seen in FIG. 11.

While several embodiments of the present invention have been illustrated and described herein, many changes can be made without departing from the spirit and scope of the invention. Accordingly, the scope of the invention is not limited by any disclosed embodiment. Instead, the scope of the invention should be determined from the appended claims that follow.

The embodiments of the invention in which an exclusive property or privilege is claimed are defined as follows:

1. A method for reducing congestion in a wireless communication system, comprising:
   determining by a network element if a wireless sector is congested;
   determining if a number of active consumer premises equipment in the wireless sector is above a threshold, wherein determining the number of active consumer premises equipment further comprises:
   for each consumer premises equipment in the wireless sector:
     tracking a number of bytes transmitted or received by a consumer premises equipment during a measurement period; and
     determining whether the number of bytes transmitted or received is above an activity threshold; and
     counting the number of consumer premises equipment that was determined to be above the activity threshold; and
   implementing a congestion prime scenario to reduce a level of congestion in the wireless sector when the number of active consumer premises equipment is above the threshold,
   wherein the network element is a base station, a remote service provider device, or a server computer.

2. The method of claim 1, wherein determining if the wireless sector is congested further comprises:
   determining a percentage of a set of airlink resources in use; and
   determining when the percentage of the set of airlink resources is above a congestion threshold.

3. The method of claim 1, wherein the congestion prime scenario comprises:
   handing off at least one consumer premises equipment to a base station in a wireless communication network.

4. The method of claim 1, wherein the congestion prime scenario comprises:
   classifying at least one consumer premises equipment as using a low-order modulation and coding scheme or a high-order modulation and coding scheme; and
   handing off at least one consumer premises equipment to another base station in a wireless communication network,
   wherein the at least one consumer premises equipment was classified as using the low-order modulation and coding scheme.

5. The method of claim 1, wherein the congestion prime scenario comprises:
   identifying at least one consumer premises equipment using a largest share of a set of airlink resources; and
     handing off the at least one consumer premises equipment to a base station in a wireless communication network.

6. The method of claim 1, wherein the congestion prime scenario comprises:
   reducing a data rate for at least one consumer premises equipment.

7. The method of claim 1, wherein the congestion prime scenario comprises:
   reducing a peak data rate for at least one consumer premises equipment using a lowest order modulation and coding scheme.

8. The method of claim 1, wherein the congestion prime scenario comprises:
   reducing a peak data rate for at least one consumer premises equipment using a largest percentage of a set of airlink resources.

9. The method of claim 1, wherein the wireless sector is a base station sector.

10. A wireless communication system for reducing congestion, comprising:
    a first base station;
    a second base station;
    at least one consumer premises equipment; and
    a data communication network facilitating data communication amongst the first base station, the second base station, and the at least one consumer premises equipment,
    wherein the wireless communication system is configured to:
      determine if a wireless sector associated with the first base station is congested;
      determine if a number of active consumer premises equipment in the wireless sector is above a threshold, wherein determining the number of active consumer premises equipment further comprises:
    for each of the at least one consumer premises equipment in the wireless sector:
      tracking a number of bytes transmitted or received by a consumer premises equipment during a measurement period; and
      determining whether the number of bytes transmitted or received is above an activity threshold; and
      counting a number of consumer premises equipment that was determined to be above the activity threshold; and
      implement a congestion prime scenario to reduce a level of congestion in the wireless sector when the number of active consumer premises equipment is above the threshold.

11. The wireless communication system of claim 10, wherein determining if the wireless sector is congested further comprises:
  determining a percentage of a set of airlink resources in use; and
  determining when the percentage of the set of airlink resources is above a congestion threshold.

12. The wireless communication system of claim 10, wherein the congestion prime scenario comprises:
  handing off at least one consumer premises equipment to the second base station in a wireless communication network.

13. The wireless communication system of claim 10, wherein the congestion prime scenario comprises:
  classifying at least one consumer premises equipment as using a low-order modulation and coding scheme or a high-order modulation and coding scheme; and
  handing off at least one consumer premises equipment to the second base station in a wireless communication network,
  wherein the at least one consumer premises equipment was classified as using the low-order modulation and coding scheme.

14. The wireless communication system of claim 10, wherein the congestion prime scenario comprises:
  identifying at least one consumer premises equipment using the most airlink resources; and
    handing off the at least one consumer premises equipment to the second base station in a wireless communication network.

15. The wireless communication system of claim 10, wherein the congestion prime scenario comprises:
  reducing a data rate for at least one consumer premises equipment.

16. A non transitory computer readable medium encoded with computer-executable instructions for reducing congestion in a wireless communication system, which when executed, performs a method comprising:
  determining if a wireless sector is congested;
  determining if a number of active consumer premises equipment in the wireless sector is above a threshold; and
  implementing a congestion prime scenario to reduce a level of congestion in the wireless sector when the number of active consumer premises equipment is above the threshold, wherein the congestion prime scenario comprises:
  classifying at least one consumer premises equipment as using a low-order modulation and coding scheme or a high-order modulation and coding scheme; and
  handing off at least one consumer premises equipment to another base station in a wireless communication network,
  wherein the at least one consumer premises equipment was classified as using the low-order modulation and coding scheme.

17. A wireless base station for reducing congestion in an associated wireless sector, comprising:
  at least one memory; and
  at least one processor operatively coupled to the at least one memory,
  wherein the wireless base station is configured to:
  determine if the associated wireless sector is congested;
  determine if a number of active consumer premises equipment in the associated wireless sector is above a threshold, wherein determining the number of active consumer premises equipment further comprises:
  for each of at least one consumer premises equipment in the associate wireless sector:
    tracking a number of bytes transmitted or received by a consumer premises equipment during a measurement period; and
    determining whether the number of bytes transmitted or received is above an activity threshold; and
    counting a number of consumer premises equipment that was determined to be above the activity threshold; and
  implement a congestion prime scenario to reduce a level of congestion in the associated wireless sector when the number of active consumer premises equipment is above the threshold.

18. The wireless base station of claim 17, wherein determining if the associated wireless sector is congested further comprises:
  determining a percentage of airlink resources in use by the wireless base station; and
  determining when the percentage of airlink resources is above a congestion threshold.

* * * * *